United States Patent [19]
Nash et al.

[11] Patent Number: 4,750,808
[45] Date of Patent: Jun. 14, 1988

[54] PROJECTION SCREEN

[75] Inventors: Gerald C. Nash, Santa Monica; Glenn M. Berggren, Claremont; Robert E. Wetmore, Manhattan Beach; Donald R. Stewart, Rolling Hills, all of Calif.

[73] Assignee: Sigma Design Group, Santa Monica, Calif.

[21] Appl. No.: 81,854

[22] Filed: Aug. 5, 1987

[51] Int. Cl.$^4$ .............................................. G03B 21/56
[52] U.S. Cl. ...................................................... 350/125
[58] Field of Search .................... 350/117, 125; 355/52

[56] References Cited
U.S. PATENT DOCUMENTS

| | | | |
|---|---|---|---|
| 2,753,818 | 7/1956 | Green | 350/125 X |
| 3,720,455 | 3/1973 | Sahlin | 350/117 |
| 3,998,522 | 12/1976 | Holzel | 350/125 |
| 4,022,522 | 5/1977 | Rain | 350/125 X |
| 4,243,315 | 1/1981 | Wolf | 355/52 |
| 4,323,301 | 4/1982 | Spector | 350/117 |
| 4,339,175 | 7/1982 | Asterö | 350/125 |
| 4,364,635 | 12/1982 | Stief | 350/125 |
| 4,478,902 | 10/1984 | Tsuzuku et al. | 350/125 X |
| 4,597,633 | 7/1986 | Fussell | 350/125 |

FOREIGN PATENT DOCUMENTS 618602  9/1935  Fed. Rep. of Germany ...... 350/125
112065 10/1944  Sweden ................................ 350/125

Primary Examiner—Richard A. Wintercorn
Attorney, Agent, or Firm—Koda and Androlia

[57] ABSTRACT

A projection screen including a rectangular film having a back surface, a front surface and a periphery, a support frame and chamber connected to the periphery of the film for defining the shape of the periphery of the film, a device for creating a pressure differential between the front surface and the back surface of the film, a sensor for sensing the position of the film and indirectly sense the pressure differential on the film and a controller for controlling the device for creating the pressure differential in response to the sensor such that the position of the film is a predetermined position as a result of some pressure differential whereby the shape of the film is set by the shape of the frame which is connected to the periphery of the film and by the predetermined position of the film resulting from the pressure differential.

30 Claims, 2 Drawing Sheets

PROJECTION SCREEN

BACKGROUND OF THE INVENTION

1. Field of the Invention

This invention relates to projection screens and more particularly to projection screens for motion pictures, slide projectors, video projectors, light projectors or other types of projectors including electronic projections or combinations thereof.

2. Prior Art

In the prior art there exists various types of projection screens. One example of such projection screens is the type found in most motion picture theaters. This type of projection screen generally comprises a reflective layer provided on a flat support. While such projection screens have been utilized for many years in motion picture theaters and similar smaller versions have been used for other applications, such screens have certain disadvantages.

In particular, the distribution of reflected light across the projection screen is not even and "hot spots" exist on the projection screen. Furthermore, such screens are not high in light efficiency and therefore require a very bright light source be provided in the projector which in turn results in high energy costs and generally high operating costs for the projector. In addition such screens are heavy, generally erected for use in one location and are not portable.

Other screens have been developed which have attempted to overcome the disadvantages of above described prior art projection screens. Examples of such other prior art projection screens are contained in United States patents listed as follows: U.S. Pat. Nos. 2,753,818, 3,720,355, 4,022,522, 4,323,301, 4,339,175.

SUMMARY OF THE INVENTION

In view of prior art, it is a general object of the present inventio to provide a projection screen which ahs even reflected light distribution, higher light efficiency, lower energy cost, higher resolution and contrast, and lower operating cost.

It is another object of the present invention to provide a projection screen which could be portable and is of a shape which can be set thereby matching the distribution of the audience and the size and shape of the theater.

In keeping with the principles of the present invention, the objects are accomplished by a unique projection screen including an elongated film having a front surface, a back surface and a periphery, a means for defining at least one curve of the periphery of the elongated film in a plane normal to the periphery of the elongated film, a means for creating a pressure differential betwen the front surface and the back surface of the film, a means for sensing the position of the elongated film and a means for controlling the means for creating the pressure differential in response to the means for sensing the position such that the position is a predeermined position whereby the shape of the elognated film is set by the means for defining a curve of the periphery of the film and by the predetermined position.

BRIEF DESCRIPTION OF THE DRAWINGS

The above mentioned features and objects of the pesent invention will become more apparent with reference to the following description taken in conjunction with the accompanying drawings wherein like reference numberals denote like elements and in which.

DETAILED DESCRIPTION OF THE INVENTION

Figure 1:
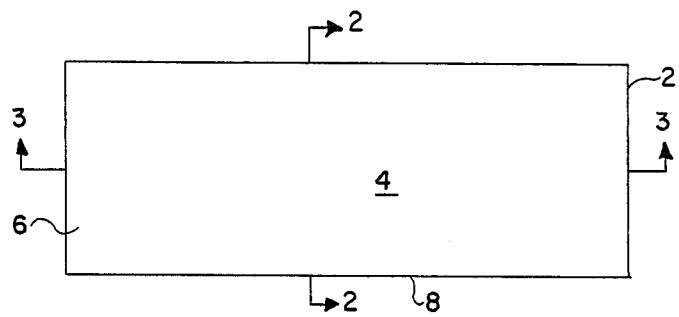
FIG. 1 is a front view of a projection screen in accordance with the teachings of the present invention.
Figure 2:
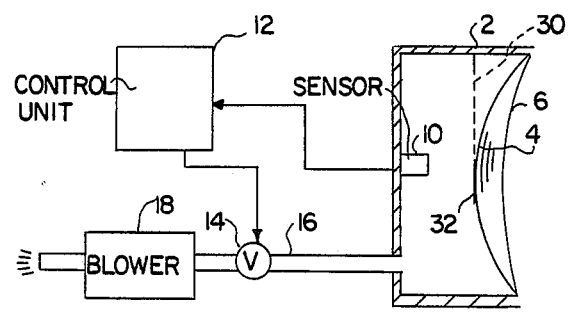
FIG. 2 is a cross-sectional view of the projection screen of FIG. 1 along the line 2—2 in FIG. 1 which also shows the additional elements of the present invention.
Figure 3:
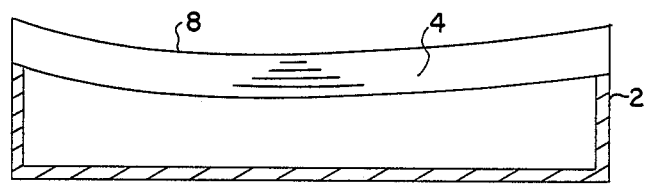
FIG. 3 is a cross-sectioal view of the projection screen of FIG. 1 along the line 3—3.
Figure 6:
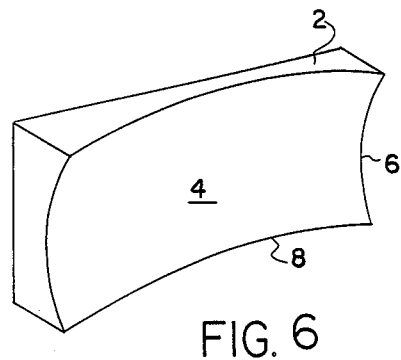
FIG. 6 is a perspective view of the projection screen of FIG. 1.

Referring to FIGS. 2 through 3 and 6, shown therein is a projection screen in accordance with the teachings of the present invention. The projection screen includes a support chamber 2 over which a thin membrane or film 4 is stretched and attached thereto at only its periphery. The film 4 is preferably a seamless elastic film, but for certain applications it need not be seamless. Also, the film 4 can be any elastic material such as a polymer fabric, metallic foil, composite or the like; but is preferably made from polyvinyl chloride acetate. The support chamber 2 includes vertical and horizontal side members 6 and 8, respectively, and as can be seen clearly in FIGS. 1, 2 and 6, the side member 6 in a plane normal to the periphery of the film 4 is curved and in a similar manner the side member 8 in a plane perpendicular to the periphery of the film 4 is also curved. The curve of the side members 6 and 8 can be a spherical shape, a compound curve, aspherical, a conical section, etc. In addition, the shapes of thecurves of the side members 6 and 8, respectively, do not have to be the same and in most instances will not be the same. Furthermore, the shape of the curves of the side member 6 and 8 are predetermined and selected in accordance with the distribution of the audience and the size and shape of the viewing theater wherein the projection screen is to be placed.

Provided within the support chamber 2 is a sensor 10. This sensor 10 directly or indirectly senses the position of at least a portion of the film 4 and indirectly senses a pressure differential betwen the front surface and the back surface of the film 4 and outputs a signal in dicative of the position of the film 4 which also indirectly indicates the pressure differential. The sensor 10 may be any type of sensor which can directly or indirectly sense the position or pressure differential. An example of a sensor which would directly sense the pressure differential would be a pressure sensor and an example of a sensor which would directly sense the position and indirectly sense the pressure differential would be a proximity sensor which senses the proximity of the film 4 to the sensor 10 as a result of the deformation of the film caused by the pressure differential. Such proximity sensors could include magnetic sensors, electromagnetic sensors, electronic sensors, mechanical sensors, etc.

The output of the sensor 10 is provided to a control unit 12. The control unit 12 controls a solenoid operated butterfly valve 14 which is coupled to the chamber formed between the support chamber 2 and the film 4 by a hose 16. A continuously running blower 18 is also coupled to the hose 16 and provides a source of vacuum thereto. The valve 14 is controlled by the control unit1 2 such that when the sensor 10 senses that the required predetermined position of the film 4 (in other words, some pressure differential) has been achieved, the valve 14 is turned OFF to close the hose 16 to matinain the pressure differential and the predeermined position. If the film 4 moves away from the predetermined position as a result of the pressure differential decreasing the control unit 12 in response to the signal from the sensor 10 will then turn the valve 14 back ON to open the hose 16 to increase the pressure differential until the predetermined position of the film 4 is achieved again. It should be apparent that by utilizing the above described structure, the pressure differential is regulated or modulated to maintain the position of the film 4 with a certain design range around the predetermined position.

It should be apparent from the above description that the pressure differential on the front and back surfaces of the film 4 will deform the film 4 until a desired position of the film 4 is achieved. As a result, the shape of the film 4 will not only be set by the curve of the side members 6 and 8, but also by the predetermined position resulting from the pressure differential. Therefore, the shape of the film 4, which in fact is the surface upon which the image is to be projected, can be varied by changing the pressure differential to set the position of the film 4.

Figure 4:
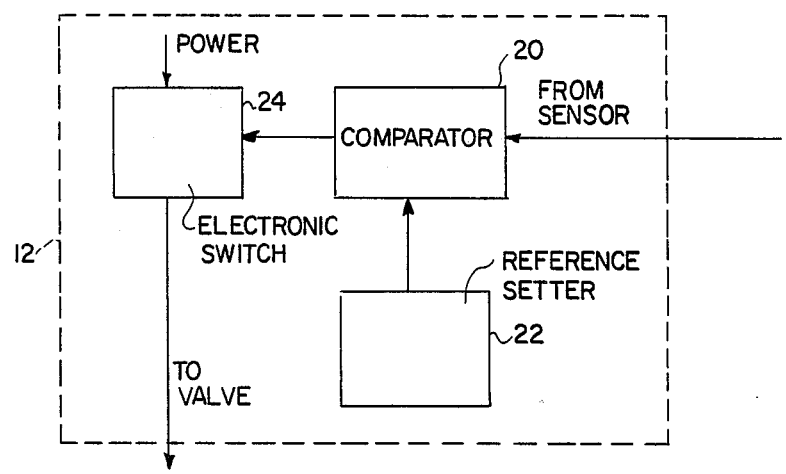
FIG. 4 is a block diagram of a control unit utilized in the present invention.

Referring to FIG. 4, shown therein is a control unit 12 in accordance with the teachings of the present invention. The control unit 12 includes a comparator 20 for receiving an output signal from the sensor 10 and comparing with a preset value from a reference setter 22. The predetermined value set in the reference setter 22 corresponds to the required preset position of the film 4 and this reference value is compared with the signal from the sensor 10 by the comparator 20. When the reference value is equal to the signal from the sensor 10, the comparator 20 will output a signal to an electronci switch 24. Power is applied to the electronic switch 24 for the valve 14 and the electonic switch 24 is provided between the power source and valve 14. Therefore, when the comparator 20 outputs a signal indicating that the output signal from the sensor 10 is at the same level as the reference value from the reference setter 22, the electronic switch 24 is turned off and power to the valve 14 is interrupted.

In addition to the above description, it should be apparent to those of ordinary skill in the art that when utilizing certain types of sensors utilized as the sensor 10, an element or member may be required to be placed in contact with the back surface of the film 4; however, the placing of such an element or member on the back surface of the film 4 may have a deleterious effect upon the shape of the film 4. Therefore, to overcome such a problem or disadvantage, a flexible member 30 in the form of web, as shown by a dotted line in FIG. 2, may be provided within the support chamber 2 and the member 32 to be detected by the sensor 10 can be provided on the flexible member 30 which is hanging down inside of the support chamber 2. In addition, it should be apparent that this flexible member 30 must be provided so that the back surface of the film 4 contacts the flexible member 30 before the flim 4 reaches the desired shape.

Figure 5:
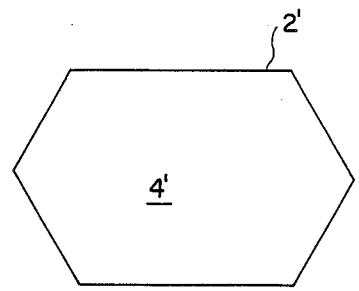
FIG. 5 illustrates an alternate shape for the projection screen of Applicant's invention.

Also, it should be apparent that while the above description has been describd in terms of essentially evacuating the chamber formed betwen the support chamber 2 and the film 4, it would also be possible to provide super atmospheric pressure to the front surface of the film 4. Furthermore, while the film 4 has prevously been describd as being imperforate, it could be provided with holes therethrough so that sound could more easily pass through the film 4. In addition, while a blower is described as being utilized as the means to create the pressure differential, other devices such as pumps, fans, valves or combiantions of such devices could be utilized also. Still further, while the control of the pressure differential has been described in terms of ON/OFF control, it could also be accomplished by proportional control Finally, while the support chamber 2 has been described and shown in the Figures as being rectangular, other shapes would be possible such as circular, triangular, hexagonal, etc. and an example of such a different shape is shown in FIG. 5 wherein the support chamber 2' is a hexagonal shape and the film 4' is provided onto the hexagonal support chamber 2'.

It should be apparent to those skilled in the art that the above describe embodimetns are merely illustrative of but a few of the many possible specific embodiments which represent the application of the principles of the present invention. Numerous and various other arrangements could be readily devised by those skilled in the art without departing from the spirit and the scope of the present invention.

We claim:
1. A projection screen comprising:
an elongated film having a front surface, a back surface and periphery;
a means coupled to said periphery of said film for defining a shape of said periphery of said elongated film to be at plane normal to the periphery of said elongated film to be at least one curve;
a means for creating a pressure differential between said front surface and said back surface of said film;
a means for sensing a position of at least a position of said elongated film; and
a means for controlling the means for creating said pressure differential in response to said means for sensing said position of said film such that said position of said filrm is a predetermined position whereby the shape of the elongated film is set by the means for defining a curve of said periphery of said film and by said predetermined position.
2. A projection screen according to claim 1, wherein said means for sensing said position of said film comprises a proximity sensor.
3. A projection screen according to claim 1, wherein said means for sensing said position of said film comprises a pressure sensor.
4. A projection screen according to claim 1, wherein said means for creating a pressure differential comprises a blower and a solenoid operated valve.
5. A projection screen according to claim 2, wherein said means for creating a pressure differential comprises a blower and a solenoid operated valve.
6. A projection screen according to claim 3, wherein said means for creating a pressure differential comprises a blower and a solenoid operated valve.
7. A projection screen according to claim 1, wherein said means coupled to said periphery of said film for defining said shape of said periphery of said elongated film is a frame.
8. A projection screen according to claim 2, wherein said means coupled to said periphery of said film for defining said shape of said periphery of said elongated film is a frame.

9. A projection screen according to claim 3, wherein said means coupled to said periphery of said film for defining said shape of said periphery of said elongated film is a frame.

10. A projection screen according to claim 4, wherein said means coupled to said periphery of said film for defining said shape of said periphery of said elongated film is a frame.

11. A projection screen according to claim 7, further comprising a vacuum chamber coupled to said frame.

12. A projection screen according to claim 8, further comprising a vacuum chamber coupled to said frame.

13. A projection screen according to claim 9, further comprising a vacuum chamber coupled to said frame.

14. A projection screen according to claim 10, further comprising a vacuum chamber coupled to said frame.

15. A projection screen according to claim 11, wherein said elongated film is seamless.

16. A projection screen according to claim 12, wherein said elongated film is seamless.

17. A projection screen according to claim 13, wherein said elongated film is seamless.

18. A projection screen according to claim 14, wherein said elongated film is seamless.

19. A projection screen according to claim 11, wherein said frame is rectangular is shape.

20. A projection screen according to claim 12, wherein said frame is rectangular in shape.

21. A projection screen according to claim 13, wherein said frame is rectangular in shape.

22. A projection screen according to claim 14, wherein said frame is rectangular in shape.

23. A projection screen according to claim 11, wherein said frame is polygonal in shape.

24. A projection screen according to claim 12, wherein said frame is polygonal in shape.

25. A projection screen according to claim 13, wherein said frame is polygonal in shape.

26. A projection screen according to claim 14, wherein said frame is polygonal in shape.

27. A projection screen according to claim 4, wherien said means for controlling comprises a reference setting means for setting a referennce signal and a comparator for comparing an output of said means for sensing said position with said reference signal.

28. A projection screen according to claim 5, wherein said means for controlling comprises a refrence setting means for setting a reference signal and a comparator for comparing an output of said means for sensing said position with said reference signal.

29. A projection screen according to claim 6, wherein said means for controlling comprises a reference setting means for setting a reference signal and a compartor for comparing an output of said means for sensing said position with said reference signal.

30. A projection screen according to claim 12, further comprising an elongated portion of material coupled at one end to said chamber and hanging downwardly between said proximity sensor and a rear surface of said elongated film.

* * * * *